3,235,536
PROCESS FOR PREPARING PHOSPHONYL POLYMERS
Albert Y. Garner, Yellow Springs, Ohio, assignor to Monsanto Company, a corporation of Delaware
No Drawing. Filed Nov. 19, 1963, Ser. No. 324,833
The portion of the term of the patent subsequent to Mar. 30, 1981, has been disclaimed
2 Claims. (Cl. 260—80)

This invention is a continuation-in-part of copending application, S.N. 841,932, and now abandoned, filed September 24, 1959, which application was in turn a continuation-in-part of applications S.N. 813,327, filed May 15, 1959, and S.N. 836,621, filed August 28, 1959, and both since abandoned. It relates to novel phosphorus polymers. More particularly, this invention relates to linear tertiary phosphine oxide polymers and methods for their preparation.

The technology of phosphorus polymers has heretofore remained relatively undeveloped. However, these polymers are growing increasingly attractive for use in specialized applications wherein their novel properties may be advantageously utilized.

It is an object of this invention to provide novel phosphorus polymers.

Another object is the provision of novel linear tertiary phosphine oxide polymers and a process for their manufacture.

Another object is the provision of novel thermally stable polymers.

A further object is the provision of novel polar polymers.

These and other objects are attained by contacting, in an organic solvent solution, a linear addition polymer of an ethylenically unsaturated secondary phosphine monomer, of a class as hereinafter set forth, with at least an equivalent proportion of an oxidizing agent.

The following examples are presented in illustration of the invention and are not intended as limitations thereon.

EXAMPLE I

Part A

Forty grams of 3-(phenylphosphino)propene are charged to a 250 ml. glas flask equipped with a reflux condenser. The monomer is placed under a nitrogen atmosphere and then is irradiated with ultraviolet light for about 20 hours at room temperature. The resulting solid material is dissolved in 150 ml. of a 1:1 by weight mixture of acetone and benzene, which solution is subsequently poured into an excess of absolute ether to precipitate the polymer. A hard, clear, glass-like polymer containing about 20.6% phosphorus by weight is obtained in about 95% yield.

Part B

Twenty grams of the linear polymer of 3-(phenylphosphino)propene prepared in Part A are dissolved in 150 ml. of acetone together with 60 ml. of a 3% by weight aqueous potassium permanganate solution. The resulting solution is stirred at about room temperature for 15 hours and then poured into an excess of hexane to precipitate the polymer. This polymer has an average degree of polymerization of about 200 and is soluble in ethanol and benzene. Upon testing for flammability by holding a lump of the polymer in the flame of a Meker burner until ignited, the polymer is found to be self-extinguishing. Analysis and infrared spectroscopy establish the polymer as being comprised of a plurality of structural units corresponding to the formula:

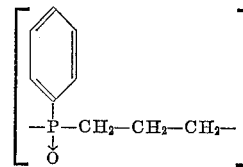

EXAMPLE II

Part A

Twenty grams of 3-(n-butylphosphino)-2-phenylpropene and 0.3 part of dibenzoyl peroxide are dissolved in 100 ml. of benzene in a stirred reactor equipped with a reflux condenser. The solution is placed under a nitrogen atmosphere and then is heated at reflux temperature (circa 80° C.) for about 20 hours. Benzene and unreacted monomer are removed from the resulting crude product by distillation under a nitrogen atmosphere. Residual impurities are removed from the resulting polymeric solids by dissolving same in 100 ml. of acetone and pouring the solution into an excess of absolute ether to reprecipitate the solids. A glass-like polymer, containing about 15.0% phosphorus by weight, is obtained.

Part B

Ten grams of the linear polymer of 3-(n-butylphosphino)-2-phenylpropene prepared in Part A are dissolved in 100 ml. of acetone together with 3 ml. of 90% by weight aqueous hydrogen peroxide solution. The resulting solution is heated at reflux for about 12 hours; then is cooled and poured into an excess of hexane to precipitate the polymer. This polymer has an average degree of polymerization of about 2100 and is soluble in ethanol and benzene. Upon testing for flammability by holding a lump of the polymer in the flame of a Meker burner until ignited, the polymer is found to be self-extinguishing. Analysis and infrared spectroscopy establish the polymer as being comprised of a plurality of structural units corresponding to the formula:

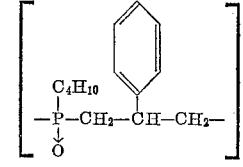

EXAMPLE III

Part A

Fifteen grams of 2-(phenylphosphino)ethyl vinyl ether and 0.3 part of azobisisobutyronitrile are charged to a 100 ml. glas flask equipped with a reflux condenser. The mixture is placed under a nitrogen atmosphere and then is heated at about 85° C. for about 25 hours. The resulting solid material is dissolved in 100 ml. of a 1:1 by weight mixture of acetone and benzene, which solution is subsequently poured into an excess of absolute ether to precipitate the polymer. A hard, glass-like polymer containing about 17.2% phosphorus by weight is obtained.

Part B

Ten grams of the linear polymer of 2-(phenylphosphino)ethyl vinyl ether prepared in Part A and 0.5 gram of lead tetraacetate are dissolved in 100 ml. of glacial acetic acid and the resulting solution is heated at reflux for about 10 hours. The reaction mixture is then cooled and poured into an excess of hexane to precipitate the polymer. This polymer has an average degree of polymerization of about 1800 and is soluble in ethanol and benzene. Upon testing for flammability by holding a lump of the polymer in the flame of a Meker burner until ignited, the polymer is found to be self-extinguishing. Analysis and infrared spectroscopy establish the polymer as being comprised of a plurality of structural units corresponding to the formula:

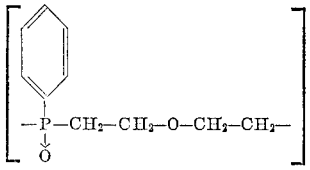

EXAMPLE IV

Part A

Fifteen grams of cyclohexylphosphino ethene and 0.5 part of ditertiary-butylperoxide are charged to a 100 ml. glass flask equipped with a reflux condenser. The mixture is placed under a nitrogen atmosphere and then is heated at about 120° C. for about 20 hours. The resulting solid material is dissolved in 100 ml. of a 1:1 by weight mixture of acetone and benzene, which solution is subsequently poured into an excess of absolute ether to precipitate the polymer. A hard, glass-like polymer containing about 21.6% phosphorus by weight is obtained.

Part B

Five grams of the linear polymer of cyclohexylphosphino ethene prepared in Part A and 0.2 gram of lead tetraacetate are dissolved in 50 ml. of dioxane and the resulting solution is heated at about 80° C. for 12 hours. The reaction mixture is then cooled and poured into an excess of hexane to precipitate the polymer. This polymer has an average degree of polymerization of about 550 and is soluble in ethanol and benzene. Upon testing for flammability by holding a lump of the polymer in the flame of the Meker burner until ignited, the polymer is found to be self-extinguishing. Analysis and infrared spectroscopy establish the polymer as being comprised of a plurality of structural units corresponding to the formula:

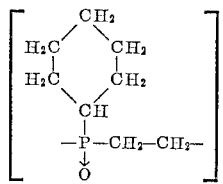

EXAMPLE V

Part A

Twenty grams of alpha-(n-heptylphosphino)styrene are charged to a 250 ml. glass flask equipped with a reflux condenser. The monomer is placed under a nitrogen atmosphere and then is irradiated with ultraviolet light for about 20 hours at room temperature. The resulting solid material is dissolved in 125 ml. of a 1:1 by weight mixture of acetone and benzene, which solution is subsequently poured into an excess of absolute ether to precipitate the polymer. A hard, glass-like polymer containing aobut 13.2% phosphorus by weight is obtained.

Part B

Ten grams of the linear polymer of alpha-(n-heptylphosphino)styrene prepared in Part A and 0.5 gram of perbenzoic acid are dissolved in 100 ml. of dioxane and the resulting solution is heated at reflux for about 12 hours. The reaction mixture is then cooled and poured into an excess of hexane to precipitate the polymer. This polymer has an average degree of polymerization of about 300 and is soluble in ethanol and benzene.

Upon testing for flammability by holding a lump of the polymer in the flame of a Meker burner until ignited, the polymer is found to be self-extinguishing. Analysis and infrared spectroscopy establish the polymer as being comprised of a plurality of structural units corresponding to the formula:

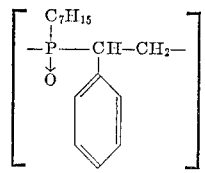

EXAMPLE VI

Part A

Ten grams of 4-(secondarybutylphosphino)-n-butyl isopropenyl ether and 0.3 part of dibenzoyl peroxide are charged to a 100 ml. glass flask equipped with a reflux condenser. The mixture is placed under a nitrogen atmosphere and then is heated at about 80° C. for about 20 hours. The resulting solid material is dissolved in 100 ml. of a 1:1 by weight mixture of acetone and benzene, which solution is subsequently poured into an excess of absolute ether to precipitate the polymer. A hard, glass-like polymer containing about 15.3% phosphorus by weight is obtained.

Part B

Five grams of the linear polymer of 4-(secondary butylphosphino)-n-butyl isopropenyl ether prepared in Part A are dissolved in 75 ml. of dioxane together with 10 ml. of a 1 normal aqueous nitric acid solution. The resulting solution is heated at about 75° C. for 15 hours; then is cooled and poured into an excess of hexane to precipitate the polymer. This polymer has an average degree of polymerization of about 1000 and is soluble in ethanol and benzene. Upon testing for flammability by holding a lump of the polymer in the flame of a Meker burner until ignited, the polymer is found to be self-extinguishing. Analysis and infrared spectroscopy establish the polymer as being comprised of a plurality of structural units corresponding to the formula:

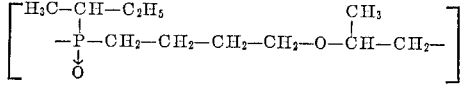

EXAMPLE VII

Part A

Ten grams of 4-(n-butylphosphino)styrene are dissolved in 75 parts of toluene in a stirred reactor equipped with a reflux condenser. The solution is placed under a nitrogen atmosphere and then is irradiated with ultraviolet light for about 20 hours at about 50° C. Toluene and unreacted monomer are removed from the resulting crude product by distillation under a nitrogen atmosphere. Residual impurities are removed from the resulting polymeric solids by dissolving same in 75 ml. of acetone and pouring the solution into an excess of absolute ether to reprecipitate the solids. A glass-like polymer containing about 16.1% phosphorus by weight is obtained.

Part B

Five grams of the linear polymer of 4-(n-butylphosphino)styrene prepared in Part A and 0.3 gram of sodium persulfate are dissolved in 75 ml. of acetone. The resulting solution is stirred at about room temperature for 8 hours and then poured into an excess of hexane to precipitate the polymer. This polymer has an average degree of polymerization of about 1700 and is soluble in ethanol and benzene. Upon testing for flammability by holding a lump of the polymer in the flame of a Meker burner until ignited, the polymer is found to be self-extinguishing. Analysis and infrared spectroscopy establish the polymer as being comprised of a plurality of structural units corresponding to the formula:

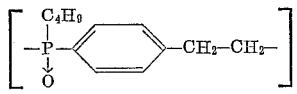

EXAMPLE VIII

Part A

Fifteen grams of 3-(n-butylphosphino)phenyl vinyl ether and 0.5 part of ditertiarybutylhydroperoxide are dissolved in 100 ml. of xylene in a stirred reactor equipped with a reflux condenser. The solution is placed under a nitrogen atmosphere and then is heated at reflux temperature (circa 150° C.) for about 20 hours. Xylene and unreacted monomer are removed from the resulting crude product by distillation under a nitrogen atmosphere. Residual impurities are removed from the resulting polymeric solids by dissolving same in 100 ml. of acetone and pouring into an excess of absolute ether to precipitate the solids. A glass-like polymer containing about 14.9% phosphorus by weight is obtained.

Part B

Five grams of the linear polymer of 3-(n-butylphosphino)phenyl vinyl ether prepared in Part A are dissolved in 75 ml. of dioxane together with 10 ml. of a 3% by weight aqueous hydrogen peroxide solution. The resulting solution is heated at reflux for about 12 hours, and then is cooled and poured into an excess of hexane to precipitate the polymer. This polymer has an average degree of polymerization of about 150 and is soluble in ethanol and benzene. Upon testing for flammability by holding a lump of the polymer in the flame of a Meker burner until ignited, the polymer is found to be self-extinguishing. Analysis and infrared spectroscopy establish the polymer as being comprised of a plurality of structural units corresponding to the formula:

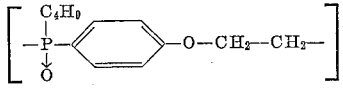

EXAMPLE IX

Part A

Fifteen grams of 4-(n-hexylphosphino)phenyl alpha-phenylvinyl ether and 0.5 part of ditertiarybutylperoxide are dissolved in 100 ml. of xylene in a stirred reactor equipped with a reflux condenser. The solution is placed under a nitrogen atmosphere and then is heated at reflux temperature (circa 150° C.) for about 20 hours. Xylene and unreacted monomer are removed from the resulting crude product by distillation under a nitrogen atmosphere. Residual impurities are removed from the resulting polymeric solids by dissolving same in 100 ml. of acetone and pouring into an excess of absolute ether to precipitate the solids. A glass-like polymer containing about 10.4% phosphorus by weight is obtained. This polymer is soluble in acetone.

Part B

Five grams of the linear polymer of 4-(n-hexylphosphino)phenyl alphaphenylvinyl ether prepared in Part A and 0.3 gram of performic acid are dissolved in 50 ml. of acetone and the resulting solution is heated at reflux for about 15 hours. The reaction mixture is then cooled and poured into an excess of hexane to precipitate the polymer. This polymer has an average degree of polymerization of about 600 and is soluble in ethanol and benzene. Upon testing for flammability by holding a lump of the polymer in the flame of a Meker burner until ignited, the polymer is found to be self-extinguishing. Analysis and infrared spectroscopy establish the polymer as being comprised of a plurality of structural units corresponding to the formula:

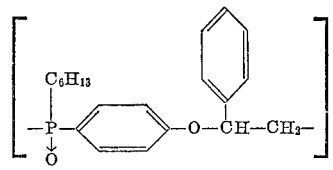

The linear addition polymers of ethylenically unsaturated secondary phosphines which are oxidized in the practice of this invention are comprised of a plurality of recurring structural units corresponding to the following general formulae:

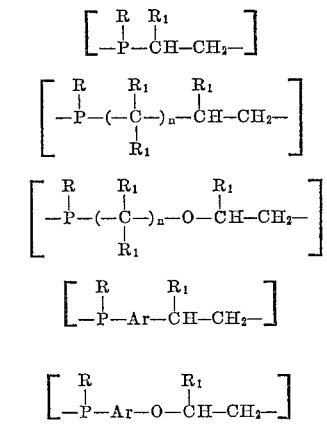

In each of the above formulae, R is a hydrocarbon radical containing from 1–12 carbon atoms and each $R_1$ group may be, independently, either hydrogen, methyl or a phenyl radical. Ar is a divalent aromatic residue containing from 6–14 carbon atoms and $n$ is an integer of from 1–6.

Such polymers may readily be prepared by the free radical polymerization of the corresponding ethylenically unsaturated secondary phosphine, of a class as hereinafter set forth.

The ethylenically unsaturated secondary phosphine monomers employed in preparing the linear polyphosphine starting materials of this invention correspond to the following general formulae:

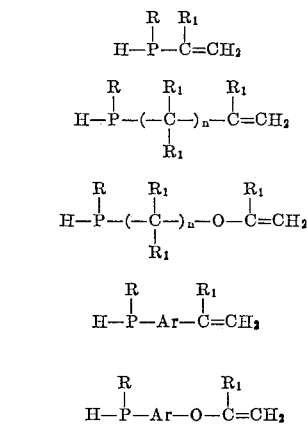

In each of the above formulae, R is a hydrocarbon radical containing from 1–12 carbon atoms and each $R_1$ group may be, independently, either hydrogen, methyl or a phenyl radical. Ar is a divalent aromatic residue containing from 6–14 carbon atoms and $n$ is an integer of from 1–6.

Therefore, the 3-(phenylphosphino)propene, 3-(n-butylphosphino)-2-phenylpropene, 2-(phenylphosphino)ethyl vinyl ether, cyclohexylphosphino ethene, alpha-(n-heptylphosphino)styrene, 4-(secondarybutylphosphino)-n-butyl isopropenyl ether, 4-(n-butylphosphino)styrene, 3-(n- butylphosphino)phenyl vinyl ether and 4-(n-hexylphosphino)phenyl alphaphenylvinyl ether employed in the examples may be replaced, for example, with one or a mixture of the following ethylenically unsaturated secondary phosphine monomers with equivalent results:

(1) A phosphino vinylidene such as methylphosphino ethene, phenylphosphino ethene, cyclohexylphosphino ethene, decylphosphino ethene, 2-(ethylphosphino)propene, 2-(phenylphosphino)propene, alpha-(methylphosphino) styrene, etc.;

(2) An omega-phosphino olefin such as 3-(isopropylphosphino)propene, 4-(methylphosphino)-1-butene, 5-(dodecylphosphino)-1-pentene, 6-(cyclohexylphosphino)-1-hexene, 7-(phenylphosphino)-1-heptene, 8-(ethylphosphino)-1-octene, etc. and the methyl and phenyl substituted derivatives thereof such as 2-methyl-3-(tertiary-butylphosphino)propene, the homologous series of from 3 - (phenylphosphino) - 1-butene through 8-(phenylphosphino)-1-nonene, 2-phenyl-3-(ethylphosphino)-1-butene, 2,3-dimethyl-3-(methylphosphino)-1-butene, 2,3-diphenyl-3 - (ethylphosphino)propene, 2 - methyl-4-(isooctylphosphino)-1-butene, 2,3-dimethyl-4-(phenylphosphino)-1-butene, 2,3,3-trimethyl-4-methylphosphino)-1-pentene, 2-phenyl - 5 - (cyclohexylphosphino)-1-pentene, 5-phenyl-5-(phenylphosphino) - 1 - pentene, 3,4-diphenyl-5-(methylphosphino) - 1-pentene, 2,3,3,4,4-pentamethyl-5-(methylphosphino) - 1 - pentene, 2-methyl-6-(decylphosphino)-1-hexene, 2-phenyl-6-(phenylphosphino)-1-hexene, 2,3,4,5-tetramethyl-6-(methylphosphino)-1-heptene, 3,4-diphenyl-6-(n-pentylphosphino)-1-hexene, 2,4,6-trimethyl-7-(ethylphosphino)-1-heptene, 2,3,4,5-tetraphenyl-6-(phenylphosphino)-1-heptene, 4-phenyl-8-(isopropylphosphino)-1-octene, etc.;

(3) An omega-phosphinoalkyl vinylidene ether including vinyl ethers such as the homologous series of from (methylphosphino)methyl vinyl ether through 6-(methylphosphino)-n-hexyl vinyl ether, the homologous series of from (phenylphosphino)methyl vinyl ether through 6-phenylphosphino)-n-hexyl vinyl ether, 1-(phenylphosphino)ethyl vinyl ether, (phenylphosphino)phenyl-methyl vinyl ether, 1-methyl-2-(cyclohexyl)ethyl vinyl ether, 2,4-dimethyl-4-(ethylphosphino)-n-pentyl vinyl ether, etc.; isopropenyl ethers such as the homologous series of from (methylphosphino)methyl isopropenyl ether through 6-methylphosphino)-n-hexyl isopropenyl ether, 1-(phenylphosphino)ethyl isopropenyl ether, 1-phenyl-3-(phenylphosphino)-n-propyl isopropenyl ether, 2,3-dimethyl-4-(tertiarybutylphosphino)-n-butyl isopropenyl ether, etc.; and styryl ethers such as the homologous series of from (phenylphosphino)methyl alphaphenylvinyl ether through 6-(phenylphosphino)-n-hexyl alpha-phenylvinyl ether, 1-phenyl-2-(methylphosphino)ethyl alpha-phenylvinyl ether, 1-(isooctylphosphino)isopropyl alpha-phenylvinyl ether, 3 - methyl-4-(ethylphosphino)-n-pentyl alpha-phenylvinyl ether, etc.;

(4) A phosphinoaromatic vinylidene compound including ortho-, meta- and para-phosphino-styrenes, phosphino-alphamethylstyrenes and phosphino-alphaphenylstyrenes such as 2-(methylphosphino)styrene,
4-(phenylphosphino)styrene,
3-(ethylphosphino)alphamethylstyrene,
4-(methylphosphino)alphaphenylstyrene, etc., phosphino-naphthalene compounds such as 1-(methylphosphino)-8-vinyl-naphthalene,
1-(isopropylphosphino)-4-vinyl-naphthalene,
3-(methylphosphino)-7-vinyl-naphthalene,
1-(phenylphosphino)-8-isopropenyl-naphthalene,
1-(methylphosphino)-4-alphaphenylvinyl-naphthalene, etc.;

and phosphino-anthracene compounds such as 9-(methylphosphino)-10-vinyl-anthracene,
1-(ethylphosphino)-8-vinyl-anthracene,
3-(methylphosphino)-4-vinyl-anthracene,
9-(methylphosphino)-10-isopropenyl-anthracene,
9-(methylphosphino)-10-alphaphenylvinyl-anthracene, etc.; and (5) A phosphinoaromatic vinylidene ether including such vinyl ethers as 4-(phenylphosphino)phenyl vinyl ether,
2-methyl-4-(methylphosphino)phenyl vinyl ether,
2-(ethylphosphino)phenyl vinyl ether,
1-vinyloxy-4-(methylphosphino)naphthalene,
1-vinyloxy-8-(methylphosphino)naphthalene,
1-vinyloxy-4-(ethylphosphino)anthracene,
9-vinyloxy-10-methylphosphino)anthracene,
1-vinyloxy-8-(methylphosphino)anthracene, etc.;

such isopropenyl ethers as 4-(secondary-butylphosphino)phenyl isopropenyl ether,
2-methyl-3-(methylphosphino)phenyl isopropenyl ether,
1-isopropenyloxy-4-(methylphosphino)naphthalene,
9-isopropenyloxy-10-(methylphosphino)anthracene,
2-isopropenyloxy-4-(methylphosphino)anthracene, etc.

and such styryl ethers as 4-(phenylphosphino)phenyl alphaphenylvinyl ether,
1-alphaphenylvinyloxy-4-(methylphosphino)naphthalene,
9-alpha-phenylvinyloxy-10-(methylphosphino)-
naphthalene, etc.

In a preferred embodiment, those ethylenically unsaturated secondary phosphine monomers wherein each $R_1$ group is hydrogen are employed. For example: methylphosphino ethene; the omega-phosphino olefins of the homologous series of from 3-(methylphosphino)propene through 8-(methylphosphino)-n-octene; the omega-phosphinoalkyl vinyl ethers of the homologous series of from (phenylphosphino)methyl vinyl ether through 6-(phenylphosphino)-n-hexyl vinyl ether; 4-(methylphosphino)styrene, 1-(methylphosphino)-4-vinyl-naphthalene, 9-(methylphosphino)-10-vinyl-anthracene, etc.; 4-(methylphosphino)phenyl vinyl ether, 1-vinyloxy-4-(phenylphosphino)naphthalene, 9-vinyloxy-10-methylphosphino-anthracene; etc.

The linear polyphosphines employed in preparing the oxidized polymers of this invention are prepared by polymerizing an ethylenically unsaturated secondary phosphine monomer of the class heretofore described. The polymerization proceeds by a free radical mechanism; the free radicals being generated from the monomer itself under the influence of heat or irradiation with, for example, actinic light, X-rays, atomic radiation, etc. or by free radical generating compounds charged to the reaction mixture. Temperature is a factor only as regards the generation of free radicals in the absence of irradiation. In such instances, polymerization temperatures within the activation temperature range of the particular free radical source employed should be used. As herein employed the term "activation temperature" relates the temperature at which the free radical generating compound decomposes at a rate such that it has a half-life of less than 100 hours, and more preferably, less than 20 hours. Conventional free radical initiators may be employed in concentrations of up to about 5% by weight, based upon the monomer. These include, for example, peroxides such as hydrogen peroxide, benzoyl peroxide, dibenzoyl peroxide, ditertiarybutyl peroxide, ditertiarybutyl hydroperoxide, cumene hydroperoxide, acetyl peroxide, etc.; azo compounds such as azobisisobutyronitrile, etc.; hydrazines; etc.

Although the use of a solvent is not normally required, it may be advantageous in certain instances to effect the polymerization in an inert organic solvent to provide increased mobility of the reactive sites and the attainment of high yields. Suitable solvents include, for example, hydrocarbons such as hexane, benzene, toluene, xylene, etc.; halobenzenes such as chlorobenzene, p- bromo-toluene, etc.; dioxane; tetrahydrofuran; dimethylformamide; etc.

These linear polyphosphines may be obtained in up to about 100% yield depending upon the reaction conditions employed. Unreacted monomers, or solvent, present in the polymerization product may be removed using conventional techniques, care being taken to avoid oxidation of the polymeric phosphine groups in so doing. Thus, distillation, either under vacuum or an inert atmosphere, will effectively remove most of the solvent and unreacted monomer present. The polymeric product may effectively be separated from residual monomer and solvent by pouring a solution, e.g., acetone, benzene, xylene, methanol, etc., into an excess of a nonsolvent such as absolute ether.

Hereinafter, for clarity and ease of discussion, these starting polymers shall be referred to simply as linear addition polymers.

The linear tertiary phosphine oxide polymers of this invention are prepared by oxidizing the corresponding linear addition polymers, supra, with at least a stoichiometric proportion of an oxidizing agent having a single electrode potential at 25° C. of from about −0.55 to −2.1, as conventionally measured in aqueous solution. The negative value of said single electrode potential arises from the convention wherein, by definition, the chemical reaction occurring at the theoretical half-cell proceeds from the reduced state to the oxidized state. For convenience, reference shall hereinafter be made to the activity of the oxidizing agents. It being understood that highly active oxidizing agents have a single electrode, potential near the −2.1 limit and, conversely, oxidants of relatively low activity approach the −0.55 limit. Suitable oxidizing agents included within the scope of the above E.M.F. range may be found by reference to any standard chemical handbook, etc. such as e.g., Lange's Handbook of Chemistry, Handbook of Chemistry and Physics, Kirk-Othmer Encyclopedia of Chemical Technology, etc. Included in such lists are organic peracids, inorganic acids, metal salts of organic and inorganic acids, oxidizing ions, etc. Therefore, if desired, the hydrogen peroxide, potassium permanganate, lead tetraacetate, perbenzoic acid, nitric acid, sodium persulfate, peracetic acid and performic acid employed in the examples may be replaced with, for example, perpropionic acid, Caro's acid, persulfuric acid, perchloric acid, lithium periodate, potassium iodate, sodium bromate, sodium arsenate, potassium perchlorate, lithium stibnate, potassium bismuthate, sodium rhenate or similar compounds releasing, for example, such oxidizing ions as $CeOH^{+3}$, $Au^{+3}$, $Mn^{+3}$, $Ag^+$, $Ag^{+2}$, $PtCl_6^{-2}$, $Hg^{+2}$, $Br_3^-$, $Cr_2O_7^{-2}$, etc.

The oxidation reaction is effected in a polar organic solvent. While many suitable solvents will not be susceptible to oxidation in the process of this invention, this invention is not limited to such solvents. However, when oxidizable solvents are employed, the solvent should be carefully selected, giving due consideration to the particular oxidizing agent to be employed and the process conditions, so as not to interfere with the preferential oxidation of the linear addition polymer. Suitable solvents include dioxane, acetone, glacial acetic acid, tetrahydrofuran, acetonitrile, polyethylene glycols, etc. Most of the oxidizing agents employed will operate satisfactorily in the organic solution. However, if desired, the efficacy of the insoluble or relatively inactive oxidizing agents may be increased by employing aqueous solutions thereof in conjunction with water-miscible organic solvents.

The rate of oxidation of the linear addition polymer varies directly with both the reaction temperature and the activity of the oxidizing agent. In general, reaction temperatures of from about room temperature to reflux may be employed, using super-atmospheric pressures, if desired, to raise the reflux temperature and shorten the reaction time. Substantially complete oxidation of the phosphorus groups can be effected within about 10–15 hours depending upon the conditions employed. If desired, partial oxidation of the phosphorus groups may be obtained by terminating the reaction at any stage.

Those linear addition polymers containing significant side chain branching should be oxidized gently to avoid oxidation of the branch chains. Chemists skilled in the art, following the teachings of this invention, should be able to select, within limits, combinations of reaction temperature, oxidizing agent and solvent capable of producing oxidation reactions of predetermined vigor.

The linear tertiary phosphine oxide polymers produced according to the teachings of this invention may be recovered in up to about 100% yield, depending upon the reaction condition employed, using conventional techniques. For example, the polymeric product may be precipitated from the final reaction mixture by pouring the same into a large excess of a non-solvent such as hexane, etc. or other non-polar hydrocarbons.

The linear tertiary phosphine oxide polymers of this invention range in molecular weight from about 200–500,000, as determined by the number average method, depending upon the molecular weight of the linear addition polymers employed. Those of lower molecular weight are generally viscous fluids while those of higher molecular weight are generally solids, ranging from soft and flexible to tough and rigid. In most instances they are self-extinguishing, being unable to support combustion. The marked polarity of these linear tertiary phosphine oxide polymers renders them generally soluble in polar solvents such as alcohols, ketones, etc.

These linear tertiary phosphine oxide polymers find wide and varied application. For example, they are useful as metal complexing resins, detergents, water softeners, etc. They may also be employed as flameproofing agents in textile, wood, paper, etc. The fluid linear tertiary phosphine oxide polymers are admirably suited for use as hydraulic fluids in critical applications, e.g., aircraft, etc., or as adhesives, whereas their solid counterparts may be extruded or cast as films, sheets, tubing, etc. for, e.g., electrical insulation, fire barriers, surface-coatings, etc.

EXAMPLE X

A rectangular chip of Ponderosa pine measuring about ¼″ x 1″ x 3″ is immersed for 4 hours in 80 ml. of a 50% by weight solution of the polymer prepared in Example I dissolved in benzene. The pine chip is then heated in an air oven at 80° C. for about 3 hours to remove all adsorbed solvent. Testing for flammability by holding the pine chip vertically in the flame of a Meker burner until ignited, the chip is found to be self-extinguishing.

The linear tertiary phosphine oxide polymers of this invention may be modified by the incorporation therein of conventional additives such as dyestuffs, fillers, extenders, stabilizers, lubricants, etc. They may be used alone or in combination with other polymeric material, e.g., with vinyl, vinylidene, aminoplast, phenolic, etc. polymers.

It is obvious that many variations may be made in the products and processes set forth above without departing from the spirit and scope of this invention.

What is claimed is:

1. A process for preparing linear tertiary phosphine oxide polymers consisting of a plurality of recurring structural units corresponding to a general formula selected from the group consisting of:

(a) 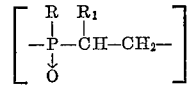

(b)

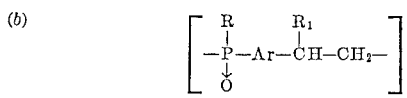

and (c)

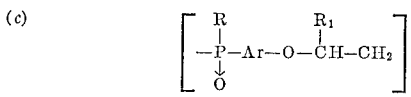

which comprises contacting an organic solvent solution of a linear phosphine polymer with at least a stoichiometric proportion of an oxidizing agent having a single electrode potential of from about −0.55 to −2.1, as measured in an aqueous solution; said linear phosphine polymer being comprised of a plurality of recurring structural units corresponding to a general formula selected from the group consisting of:

($a^1$)

($b^1$)

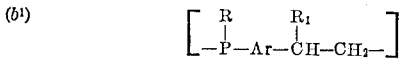

and ($c^1$)

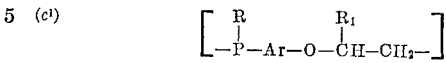

wherein, in each of the above formulae, $n$ is an integer of from 1–6, Ar is a divalent aromatic hydrocarbon residue containing from 6–14 carbon atoms, R is a hydrocarbon radical containing from 1–12 carbon atoms and each $R_1$ is a radical independently selected from the group consisting of hydrogen, methyl and phenyl radicals.

2. A process as in claim 1 wherein the oxidizing agent is hydrogen peroxide.

References Cited by the Examiner

UNITED STATES PATENTS

| | | | |
|---|---|---|---|
| 2,803,597 | 8/1957 | Stiles | 260—606.5 |
| 3,127,357 | 3/1964 | Garner | 260—80 |
| 3,145,234 | 8/1964 | Buckler et al. | 260—606.5 |

JOSEPH L. SCHOFER, *Primary Examiner.*